US008688681B1

(12) United States Patent
Xiao et al.

(10) Patent No.: US 8,688,681 B1
(45) Date of Patent: Apr. 1, 2014

(54) IDENTIFYING INTERNET PROTOCOL ADDRESSES FOR INTERNET HOSTING ENTITIES

(75) Inventors: Li Xiao, San Jose, CA (US); Arup Mukherjee, San Jose, CA (US)

(73) Assignee: Google Inc., Mountain View, CA (US)

( * ) Notice: Subject to any disclaimer, the term of this patent is extended or adjusted under 35 U.S.C. 154(b) by 463 days.

(21) Appl. No.: 12/817,695

(22) Filed: Jun. 17, 2010

Related U.S. Application Data

(60) Provisional application No. 61/218,056, filed on Jun. 17, 2009.

(51) Int. Cl.
*G06F 7/00* (2006.01)
*G06F 17/30* (2006.01)

(52) U.S. Cl.
USPC .......................................... 707/709; 707/710

(58) Field of Classification Search
None
See application file for complete search history.

(56) References Cited

U.S. PATENT DOCUMENTS

| | | | | |
|---|---|---|---|---|
| 6,487,555 | B1 * | 11/2002 | Bharat et al. ......................... | 1/1 |
| 7,188,138 | B1 * | 3/2007 | Schneider ..................... | 709/203 |
| 2008/0005127 | A1 * | 1/2008 | Schneider ...................... | 707/10 |
| 2008/0016233 | A1 * | 1/2008 | Schneider ..................... | 709/230 |
| 2008/0235383 | A1 * | 9/2008 | Schneider ......................... | 707/3 |
| 2009/0327489 | A1 * | 12/2009 | Swildens et al. ................ | 707/10 |

OTHER PUBLICATIONS

Pant, et al. "Crawling the Web", Web Dynamics: Adapting to Change in Content, Size, Topology and Use, Springer, 2003, 25 pages.
Shkapenyuk, V., "Design and Implementation of a High-Performance Distributed Web Crawler", CIS Department Polytechnic University, Brooklyn NY, Aug. 2001 pp. 1-22.
Castillo, Carolos; "Effective Web Crawling", Dept of Computer Science—University of Chile, Nov. 2004, pp. 1-191.
Boldi, et al. "UbiCrawler: a scalable fully distributed Web crawler", Software: Practice and Experience, Mar. 2004, vol. 34, Issue 8, 14 pages.
Yates, et al. "Crawling a Country: Better Strategies than Breadth-First for Web Page Ordering", Proceedings of the 14th International Conference on World Wide Web / Industrial and Practical Experience Track, 2005, pp. 864-872.
Xiao, et al., "Reliability of Internal BGP Networks: Models and Optimizations", ideals.illinois.edu [online]. Ideals, Mar. 7-11, 2004 [retrieved on Feb. 14, 2013]. Retrieved from the Internet: <URL:https://www.ideals.illinois.edu/bitstream/handle/2142/11074/Reliability%20of%20Internal%20BGP%20Networks%20Models%20and%20Optimizations.pdf?sequence=2>, 14 pages.

(Continued)

*Primary Examiner* — Loan T Nguyen
(74) *Attorney, Agent, or Firm* — Fish & Richardson P.C.

(57) ABSTRACT

Methods, systems, and apparatus, including computer programs encoded on computer storage media, for identifying web hosting entities. In one aspect, a system includes one or more computers programmed to perform operations including maintaining an Internet Protocol (IP) address history for each hostname in a plurality of hostnames. Each IP address history is a time series of IP addresses. The operations further include organizing the hostnames into a collection of groups so that each hostname of the plurality of hostnames is a member of exactly one group in the collection of groups. Each group has a kernel calculated from the IP address histories of the members of the group, and the IP address history of each member of the group is within a threshold distance of the kernel of the group.

22 Claims, 8 Drawing Sheets

(56) References Cited

OTHER PUBLICATIONS

Lui, K., et al., "QoS Multicast Routing with Heterogeneous Receivers", cairo.cs.uiuc.edu [online]. Proceedings of the IEEE Global Telecommunications Conference (Globecom 2003), San Francisco, CA, USA, Dec. 1-5, 2003 [retrieved on Feb. 14, 2013]. Retrieved from the Internet: <URL: http://cairo.cs.uiuc.edu/publications/papers/globecom03_multicast.pdf>, 5 pages.

Wang, J., et al., "Bandwidth Sensitive Routing in DiffServ Networks with Heterogeneous Bandwidth Requirements", cairo.cs.uiuc.edu [online]. Proceedings of ICC '03, Anchorage, Alaska, May 11-15, 2003 [retrieved on Feb. 14, 2013]. Retrieved from the Internet: <URL: http://cairo.cs.uiuc.edu/publications/papers/ICC-2003-wang.pdf>, 5 pages.

Wang, J., et al., "Edge-based Traffic Engineering for OSPF Networks", monet.web.cs.illinois.edu [online]. Elsevier Journal on Computer Networks, vol. 48, 2004 [retrieved on Feb. 14, 2013]. Retrieved from the Internet: <URL: http://monet.web.cs.illinois.edu/publications/papers/ComputerNetworks-wang.pdf>, 30 pages.

Xiao, L., et al., "Advertising Interdomain QoS Routing Information", IEEE Journal on Selected Areas in Communications, vol. 22, No. 10, Dec. 2004, pp. 15 pgs.

Xiao, L., et. al., "BGP Session Lifetime Modeling in Congested Networks", monet.web.cs.illinois.edu [online]. Elsevier Journal on Computer Networks, 2005 [retrieved on Feb. 14, 2013]. Retrieved from the Internet: <URL: http://monet.web.cs.illinois.edu/publications/papers/bgpcong.pdf>, 23 pages.

Xiao, L., et al., "Enhanced Ticked-based QoS Routing Algorithms", cairo.cs.uiuc.edu [online]. Master's Thesis, Department of Computer Science, University of Illinois at Urbana-Champaign, Illinois, USA, 2002 [retrieved on Feb. 14, 2013]. Retrieved from the Internet: <URL: http://cairo.cs.uiuc.edu/publications/papers/thesis_1x.pdf>, 70 pages.

Xiao, L., et al. "Minimum User-perceived Interference Routing in Service Composition", ideals.illinois.edu [online]. Ideals, Apr. 2006 [retrieved on Feb. 14, 2013]. Retrieved from the Internet: <URL: https://www.ideals.illinois.edu/bitstream/handle/2142/11075/Minimum%20User-perceived%20Interference%20Routing%20in%20Service%20Composition.pdf?sequence=2>, 12 pages.

Xiao, L., et al., "Optimizing the IBGP Route Reflection Network", cairo.cs.uiuc.edu [online]. Proceedings of the IEEE International Conference on Communications (ICC 2003), Anchorage, Alaska, May 2003 [retrieved on Feb. 14, 2013]. Retrieved from the Internet: <URL: http://cairo.cs.uiuc.edu/publications/papers/icc2003-lixiao.pdf>, 5 pages.

Xiao, L., "Resilient Interdomain Routing with BGP—Protocols and Reliability Engineering", cairo.cs.uiuc.edu [online]. PhD Thesis, Department of Computer Science, University of Illinois at Urbana-Champaign, Illinois, USA, 2005 [retrieved on Feb. 14, 2013]. Retrieved from the Internet: <URL: http://cairo.cs.uiuc.edu/publications/papers/final_1x.pdf>, 189 pages.

Xiao, L., et al., "The Enhanced Ticket-based Routing Algorithm", cairo.cs.uiuc.edu [online]. Master's Thesis, Department of Computer Science, University of Illinois at Urbana-Champaign, Illinois, USA, Dec. 2002 [retrieved on Feb. 14, 2013]. Retrieved from the Internet: <URL: http://cairo.cs.uiuc.edu/publications/papers/icc2002-li-jun.pdf>, 70 pages.

Xiao, L., et al., "QoS Extension to BGP", cairo.cs.uiuc.edu [online]. Proceedings of the 10th IEEE International Conference on Network Protocols, (ICNP 2002), Paris, France, Nov. 12-15, 2002 [retrieved on Feb. 14, 2013]. Retrieved from the Internet: <URL: http://cairo.cs.uiuc.edu/publications/papers/icnp2002-li.pdf>, 10 pages.

Xiao, L., et al., "Reliability-aware IBGP Route Reflection Topology Design", monet.web.cs.illinois.edu [online]. Proceedings of 11th IEEE International Conference on Network Protocols, Atlanta, Georgia, USA, Nov. 4-7, 2003 [retrieved on Feb. 14, 2013]. Retrieved from the Internet: <URL: http://monet.web.cs.illinois.edu/publications/view.php?action=list&area=all&type=all>, 10 pages.

* cited by examiner

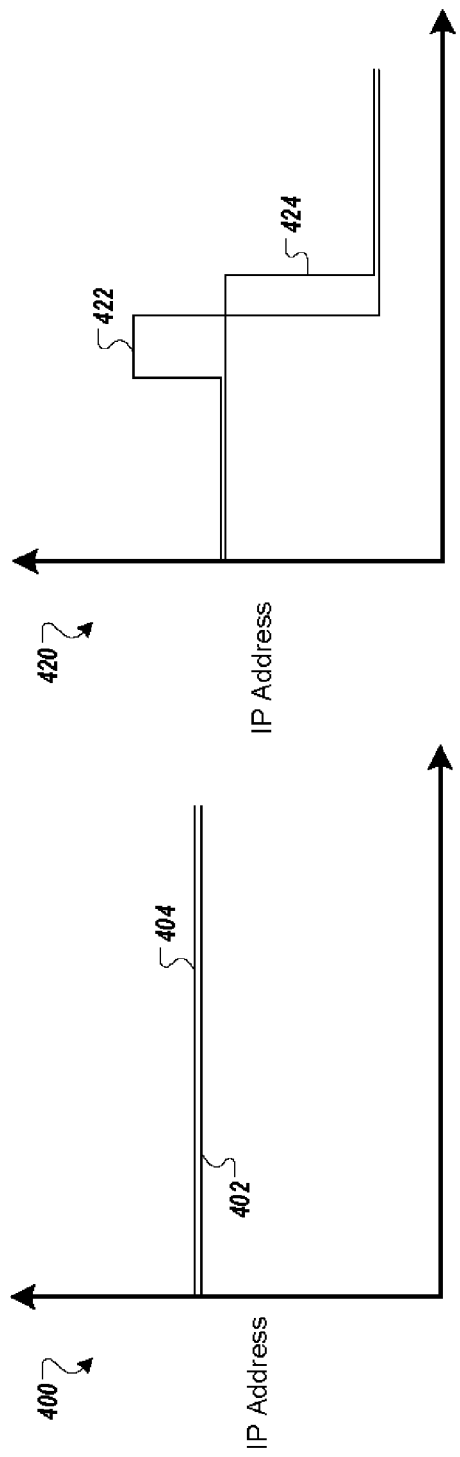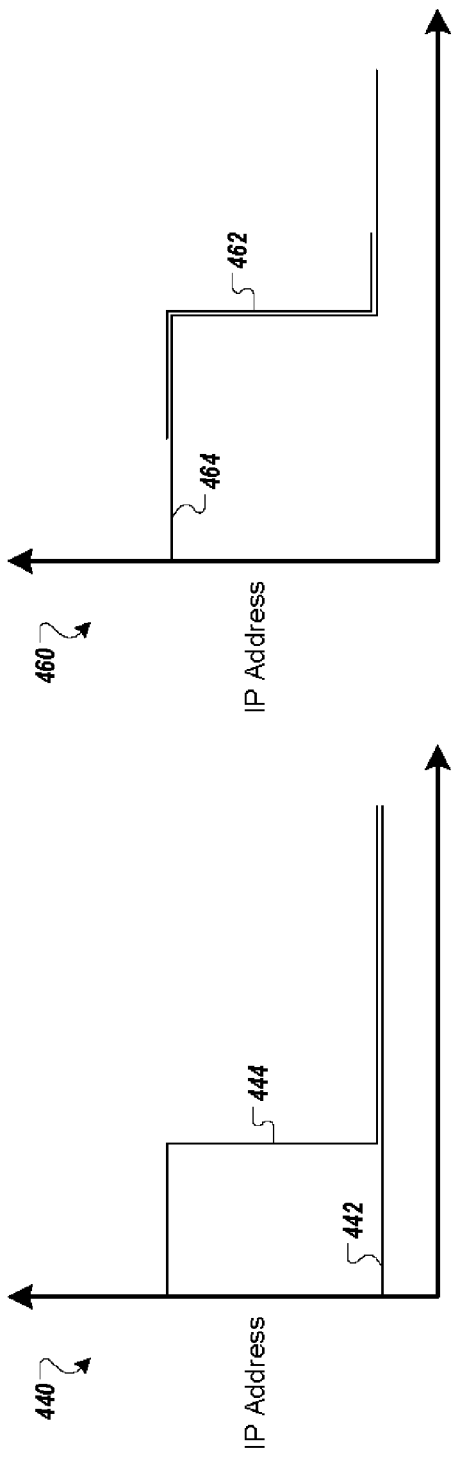

IDENTIFYING INTERNET PROTOCOL ADDRESSES FOR INTERNET HOSTING ENTITIES

CROSS-REFERENCE TO RELATED APPLICATIONS

This application claims priority under 35 USC §119(e) to U.S. Provisional Application Ser. No. 61/218,056, filed on Jun. 17, 2009, and entitled "Identifying Internet Hosting Entities," the entire contents of which are hereby incorporated by reference.

BACKGROUND

A typical search engine uses a search index to facilitate fast retrieval of information from hosts on the Internet. For example, a search index may include a portion of some content from a particular website or the entire contents of the website. A user sends a search request to the search engine and the search engine then performs the requested search on the local copy of the content in the search index rather than retrieving content from websites in real time. Performing the search on the local copy of the content is generally faster than retrieving the content from the website in real time and then performing the search on the retrieved content.

Unfortunately, the Internet is not a stable place. Websites come and go, and content within a website can change over time. Therefore the search index must be updated periodically. A search system generally includes a web crawler that updates the content in the search index. The web crawler can retrieve content from websites already included in the search index to determine if changes, additions, or deletions have been made. In some cases, a web crawler can receive lists of websites to add to or remove from the search index, such as from an administrator of a website. In some cases, a web crawler can traverse hyperlinks in visited websites to determine new websites to add to the search index.

SUMMARY

This specification describes technologies relating to identifying groups of hostnames associated with a hosting entity. A hosting entity can be, for example, a web sever or a server farm. Each hosting entity is a physical crawlable resource on the Internet and has one or more Internet Protocol (IP) addresses. The identification of the groups of hostnames is based on comparisons of Internet Protocol (IP) address histories of the hostnames and, in some implementations, other Domain Name System (DNS) information about the hostnames. The memberships of the groups of hostnames are updated as the IP addresses of the hostnames change. A website having a particular hostname can be removed from a group when the time series of IP addresses in the DNS history associated with the hostname diverges from the time series of IP addresses in the DNS histories of the other hostnames in the group. Groups, each including one or more hostnames, are combined when the time series of IP addresses in the DNS histories of the hostnames in the two groups converge. However, some changes in the IP addresses of hostnames associated with a group can be irrelevant. That is, some IP address changes do not result in the hostname changing its hosting entity, and therefore not all IP address changes lead to group membership changes. In some implementations, the groups can be provided to a crawler for use in crawling the hosting entities and generating crawl and indexing statistics for the websites. In some implementations, the groups of websites allow the crawler to independently crawl the Internet hosting entities represented by each group and to share the crawl load among the websites within an Internet hosting entity.

In one aspect, a system includes one or more computers programmed to perform operations including maintaining an Internet Protocol (IP) address history for each hostname in a plurality of hostnames. Each IP address history is a time series of IP addresses. The operations further include organizing the hostnames into a collection of groups so that each hostname of the plurality of hostnames is a member of exactly one group in the collection of groups. Each group has a kernel calculated from the IP address histories of the members of the group, and the IP address history of each member of the group is within a threshold distance of the kernel of the group. The operations further include providing to a crawler, for use in scheduling a crawl of the plurality of hostnames, data describing the collection of groups.

Implementations can include any, all, or none of the following features. The operations further include receiving one or more updates to the IP address histories of the hostnames, determining a distance between the IP address history of each member of each group and the kernel of the group, and reorganizing the hostnames into groups in the collection using the distances. Reorganizing the hostnames into groups in the collection using the distances includes applying a higher weight to a recent portion of the IP address history of each member of each group and the kernel of the group than is applied to an older portion of the IP address history of each member of each group and the kernel of the group. Reorganizing includes one or more of adding a group to the collection of groups, removing a group from the collection of groups, and moving one or more of the plurality of hostnames from one group to another group in the collection of groups. The operations further include repeating the steps of determining the distances and reorganizing the hostnames until the groups converge to a steady state. The operations further include receiving an update to an IP address history for a first hostname of the plurality of hostnames, the first hostname being a member of a first group of the collection of groups, the first group having a first kernel; determining that the updated IP address history is not within the threshold distance of the first kernel and, as a result, removing the first hostname as a member of the first group; and determining that the updated IP address history is within the threshold distance of a second kernel of a second group of the collection of groups and, as a result, adding the first hostname as a member of the second group. The operations further include receiving an update to an IP address history for a first hostname of the plurality of hostnames, the first hostname being a member of a first group of the collection of groups, the first group having a first kernel; determining that the updated IP address history is not within the threshold distance of the first kernel and, as a result, removing the first hostname as a member of the first group; and defining a new group in the collection of groups, the new group having the first hostname as an initial member of the new group. The operations further include receiving an update to an IP address history for a first hostname of the plurality of hostnames, the first hostname being a member of a first group of the collection of groups, and recalculating a first kernel of the first group using the updated IP address history of the first hostname; receiving an update to an IP address history for a second hostname, the second hostname being a member of a second group of the collection of groups, and recalculating a second kernel of the second group using the updated IP address history of the second hostname; and determining that the first kernel is within the threshold distance of the second kernel and, as a result, merging the first group and the second group into a single group in the collection of groups. The operations further include selecting a crawling schedule of the first group or the second group for use with the merged single group, where hostnames of the first and second groups are associated with respective numbers of Uniform Resource Locators (URLs) and the selected crawling schedule is chosen to minimize a total number of URLs that are changed to a new crawling schedule as a result of the selection. The operations further include selecting the first group and the second group for merging based on the first group having a highest number of edges in a star topology, the edges connecting the first group to one or more candidate groups that are candidates for merging with the first group, the candidate groups including the second group. The candidate groups include a candidate group that does not have a threshold amount of data within the IP address histories, and, as a result, the candidate group does not contribute to the number of edges for the first group. The operations further include determining from the IP address histories that the first group and the second group include dynamic IP addresses, and wherein determining that the first kernel is within the threshold distance of the second kernel includes comparing a longer portion of the first kernel and the second kernel than is compared for groups having static IP addresses. The operations further include determining from the IP address histories that the first group includes static IP addresses and, as a result, the merging is performed after a predetermined delay. The operations further include determining that the first group includes more than a predetermined number of sitenames and, as a result, the combining is performed without delay. The operations further include performing the step of receiving the updates to the IP address histories for the first and second hostnames at a first network location and at a second network location. The kernel of each group includes a set of most frequently occurring IP addresses at each point in time within the IP address histories of the members of the group. The operations further include identifying equivalent IP addresses in the IP address history of at least one of the plurality of hostnames and selecting at least one of the equivalent IP addresses that results in a minimum distance between the IP address history of the at least one of the plurality of hostnames and the kernel of the group for the at least one of the plurality of hostnames. Identifying the equivalent IP addresses includes identifying multiple IP addresses in a single update to the IP address history of the at least one of the plurality of hostnames. Identifying the equivalent IP addresses includes identifying a fixed set of IP addresses through which the IP address history of the at least one of the plurality of hostnames rotates. The operations further include interpolating a missing portion of the IP address history of the at least one of the plurality of hostnames based on the equivalent IP addresses. Multiple hostnames of at least one of the groups are in a same wildcard domain and the operations further include combining the IP address histories of the hostnames that are in the same wildcard domain prior to calculating the kernel of the at least one of the groups. The operations further include determining that the IP address history of at least one of the multiple hostnames that are in the same wildcard domain is different than the kernel of the at least one of the groups and excluding the at least one of the multiple hostnames from the wildcard domain. Multiple hostnames of at least one of the groups have a same canonical name and the operations further include combining the IP address histories for the multiple hostnames that have the same canonical name prior to calculating the kernel of the at least one of the groups. The operations further include maintaining a history of canonical names for each of the multiple hostnames of the at least one of the groups, smoothing the histories of canonical names, and comparing the smoothed histories of canonical names to determine that the multiple hostnames of at least one of the groups have the same canonical name. The operations further include interpolating a missing portion of the IP address histories of one or more of the plurality of hostnames based on a constant IP address in the IP address histories of the one or more of the plurality of hostnames. The operations further include interpolating a missing portion of the IP address histories of one or more of the plurality of hostnames based on a repeating pattern in the IP address histories of the one or more of the plurality of hostnames.

In one aspect, a system includes one or more computers programmed to perform operations including maintaining an Internet Protocol (IP) address history for each hostname in a plurality of hostnames. Each IP address history is a time series of IP addresses. The operations further include organizing the hostnames into a collection of groups so that each hostname of the plurality of hostnames is a member of exactly one group in the collection of groups. Each group has a kernel calculated from the IP address histories of the members of the group, and the IP address history of each member of the group is within a threshold distance of the kernel of the group. The operations further include reporting the hostnames in each group in the collection of groups as being hosted by a respective distinct hosting entity.

Particular embodiments of the subject matter described in this specification can be implemented so as to realize one or more of the following advantages. A system using an IP address history to group websites provides a more accurate conclusion or inference as to which websites are hosted by which real world hosting entities than one that uses only the current IP address or hostname. A system using an IP address history to group websites provides a more stable conclusion or inference as to which websites are hosted by which real world hosting entities than one that uses only the current IP address or hostname. A system can maintain a schedule of crawls and crawl statistics of an Internet hosting entity when Internet Protocol addresses of one or more websites hosted by the Internet hosting entity change, for example, when the addresses change due to load balancing, due to transient changes, due to different addresses being provided by a dynamic DNS service, or due to an actual change in the Internet hosting entity (e.g., all of the websites are moved to a new hosting entity). After processing changes in IP addresses of websites, a system can provide a shared crawl load for websites belonging to the same Internet hosting entity and independent crawl loads for websites belonging to separate Internet hosting entities. A system can modify a crawl rate for an entire group of hostnames associated with a hosting entity as a result of a slow response or an error at a single hostname within the group of hostnames. A system can reduce computer resource consumption (e.g., memory usage and central processing unit usage) by preventing moves of websites from one crawling queue to another crawling queue due to transient IP address changes, load balancing IP address changes, or dynamic DNS IP address changes.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIG. 4A is a graph of a kernel for a first group and a kernel for a second group.

FIG. 4B is a graph of a kernel for a first group and a kernel for a second group.

FIG. 4C is a graph of a kernel for a first group and a kernel for a second group.

FIG. 4D is a graph of a kernel for a first group and a kernel for a second group.

Like reference numbers and designations in the various drawings indicate like elements.

DETAILED DESCRIPTION

Figure 1:
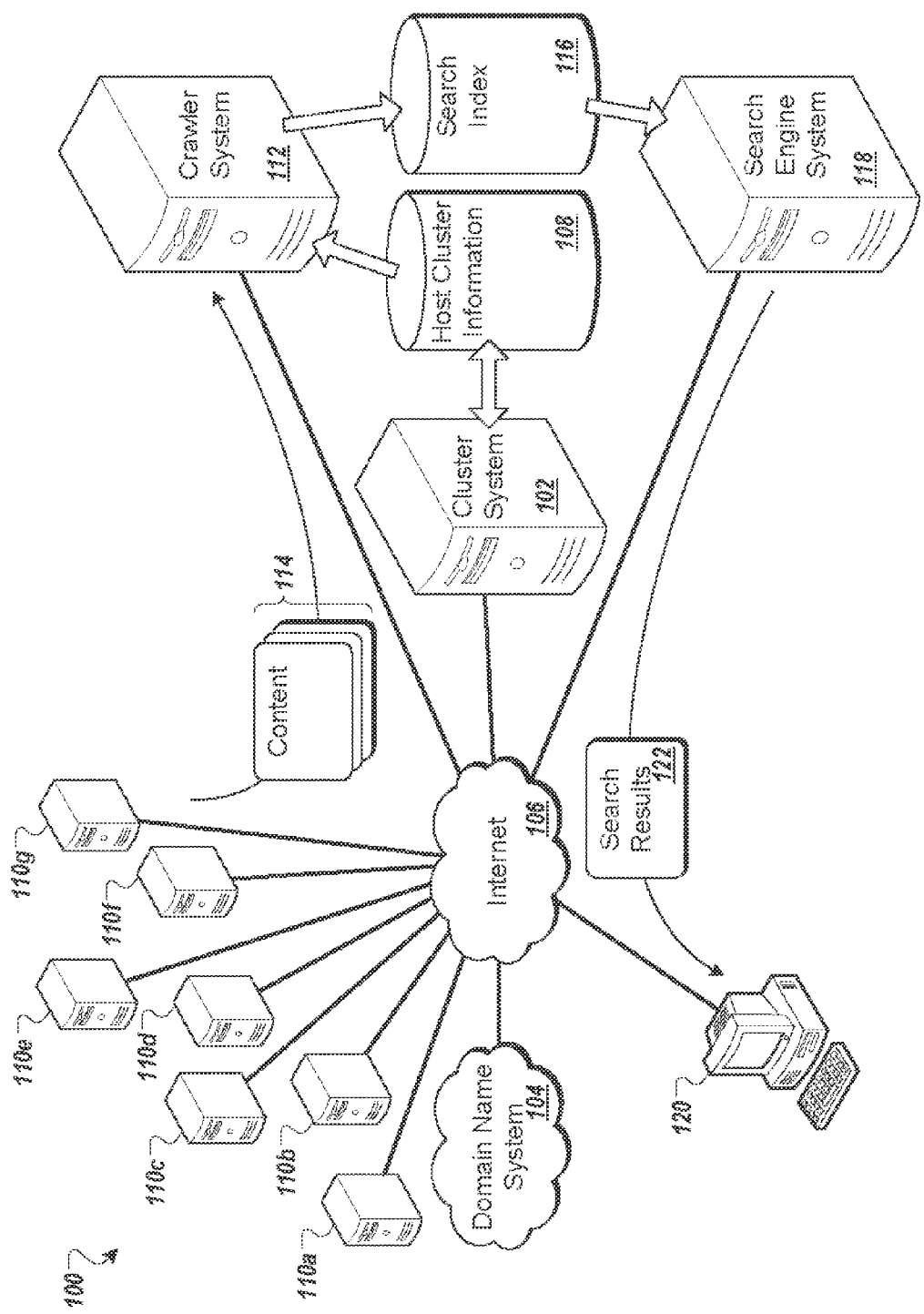
FIG. 1 is a schematic diagram showing an example system for identifying websites hosted by an Internet hosting entity.

FIG. 1 is a schematic diagram showing an example system 100 for identifying websites hosted by an Internet hosting entity. The system 100 includes a cluster system 102 in communication with a domain name system 104 over a network 106, such the Internet. The cluster system 102 sends requests to the domain name system 104 to lookup Internet Protocol (IP) addresses for hostnames of websites. The cluster system 102 tracks the changes to the IP addresses of the websites over time and stores the changes in a host cluster information data store 108. The host cluster information data store 108 is one or more computer-accessible data storage devices. The websites are hosted by one or more Internet hosting entities 110*a-g*. The cluster system 102 analyzes the IP address histories of the websites and the other domain name information provided by the domain name system 104 to define groups of websites. The cluster system 102 associates each group with one of the Internet hosting entities 110*a-g*, the existence of which is inferred by the system.

The cluster system 102 stores data identifying the groups of websites in the host cluster information data store 108. Each group of websites is used to generate an independent queue of websites (and URLs within the websites) to be crawled for a particular hosting entity. In other words, for each group there is a crawling queue. The group represents a hosting entity and the crawling queue provides a schedule for crawling the websites and URLs within the websites at the hosting entity. The crawling queues are independent in that crawling activity resulting from a first queue will not affect the performance of a second queue that crawls another hosting entity.

An Internet hosting entity can host one or more websites. Each website can have one or more hostnames that identify the website. A hostname is a unique name by which a website, or other type of host, is known on the network 106. A hostname can have one or more associated IP addresses. A system, such as the cluster system 102, can send a request to the domain name system 104 for the IP addresses and other domain name information, such as canonical names (CNAMEs), associated with a particular hostname. The cluster system 102 analyzes the IP addresses and other domain name information to organize the websites into groups or clusters of websites having the same IP address histories or having portions of IP address histories that are similar. Each cluster represents an Internet hosting entity.

Requesting URLs from a hosting entity as part of crawling the websites at the hosting entity consumes resources of the hosting entity. Crawls can be scheduled in order to prevent overloading of a hosting entity. For example, the maximum amount of time allocated to refresh URLs or websites at a hosting entity can be divided by the total number of URLs of all websites, respectively, to determine an expected crawl rate for the hosting entity. In some implementations, websites (and the URLs for the websites) belonging to the same group are placed in one queue for a crawler to process such that the rate at which content is retrieved from the Internet hosting entity can be controlled.

In general, the IP address associated with some hostnames can change over time. Some changes can result when the website is moved to another Internet hosting entity. Other changes in the IP address can result from normal operation at the same Internet hosting entity. For example, a temporary or transient IP address change may occur during system maintenance at the Internet hosting entity. A main server may be taken offline while a backup server having a different IP address is brought online for a short period of time during the maintenance. In another example, the website may have a dynamic IP address provided by a Dynamic Host Configuration Protocol (DHCP) server. In this example, the dynamic IP address may change relatively frequently as the DHCP server reassigns IP addresses to the website. In another example, an Internet hosting entity may employ a load balancing scheme, such that depending on the conditions (e.g., network usage or geographic region) one of multiple IP addresses may be used. In another example, the domain name system 104 may provide multiple IP addresses for a multi-homing web server depending on the network location or geographic location of the system making the request for the IP address of the multi-homing web server. In some cases, a change in the determination by the domain name system 104 of the location of the system making the request may result in a change in the IP address of the multi-homing web server provided to the requesting system.

The cluster system 102 analyzes the IP address histories to determine, for example, when an IP address history of a website has sufficiently diverged from the IP address history of the group of websites to which it belongs that it should be removed from the group. In some implementations, the cluster system 102 can base the decision to remove a website from a group on the length of time that the website has an IP address that does not match or is not close to the IP addresses of the other websites in the group.

The cluster system 102 analyzes the IP address histories of two or more groups to determine, for example, when the IP addresses of one group are sufficiently close enough to those of another group that the groups can be combined. In some implementations, the cluster system 102 bases the decision to merge or combine two or more groups on the length of time that the groups have IP addresses that match or are within some threshold distance of one another.

In some implementations, the length of time that the IP addresses of a website differ from the group before the cluster system 102 removes the website from the group can be chosen to provide stability for the group. For example, the length of time can be chosen to be greater than a typical amount of time for a transient IP address change. In another example, the length of time can be chosen to be greater than a typical length of time for all of the websites in the group to complete a transition to a new IP address during an IP reassignment operation.

The cluster system 102 stores data characterizing the identified groups of websites in the host cluster information data store 108 and makes it available to a crawler system 112. The crawler system 112 can retrieve the data and use it to schedule crawls of the Internet hosting entities 110a-g. For example, a first group of websites, and URLs within those websites, may correspond to the Internet hosting entity 110a. The crawler system 112 can schedule a crawl of the websites at the Internet hosting entity 110a are not expected to interfere with crawls directed to the other Internet hosting entities. However, a crawl on one website at the Internet hosting entity 110a may interfere with crawls of other websites at the Internet hosting entity 110a. The crawler system 112 receives content 114 from the Internet hosting entities 110a-g and stores the content 114 in a search index 116.

In some implementations, the cluster system 102 and/or the crawler system 112 can have multiple access points to the network 106. For example, the crawler system 112, or multiple instances of the crawler system 112, can operate in a first network or geographic location, such as the United States of America, and in a second network or geographic location, such as Europe. From the different access points, the domain name system 104 may provide different DNS information (e.g., IP addresses and canonical names) for the same hostname. The cluster system 102 can aggregate this different DNS information to compute a globally consistent Internet hosting identification result. For example, aggregating can include finding the kernel of the IP address histories. In another example, aggregating can include processing the IP address histories as equivalent IP addresses. In another example, aggregating can include using the IP address histories to fill in gaps in one another.

The cluster system 102 can also compute a local identification result for one specific access point. Depending on whether a crawl is performed locally or globally, the cluster system 102 can select either the IP address histories for the global IP addresses or the IP address histories for the local IP addresses. Accordingly, the cluster system 102 can calculate a global kernel using the IP address histories for the global IP addresses and a local kernel using the IP address histories for the local IP addresses. The cluster system 102 can utilize the global kernel and global IP address histories when crawling from a global location. Alternatively, the cluster system 102 can utilize the local kernel and local IP address histories when crawling from a local location.

A search engine system 118 can use the search index 116 to perform search queries for content from the websites at the Internet hosting entities 110a-g. For example, the search engine system 118 may receive a search request from a client device 120. The search engine system 118 performs the query from the search request on the content 114 in the search index 116. The search engine system 118 determines one or more search results 122 and provides the search results 122 to the client device 120.

Figure 2:
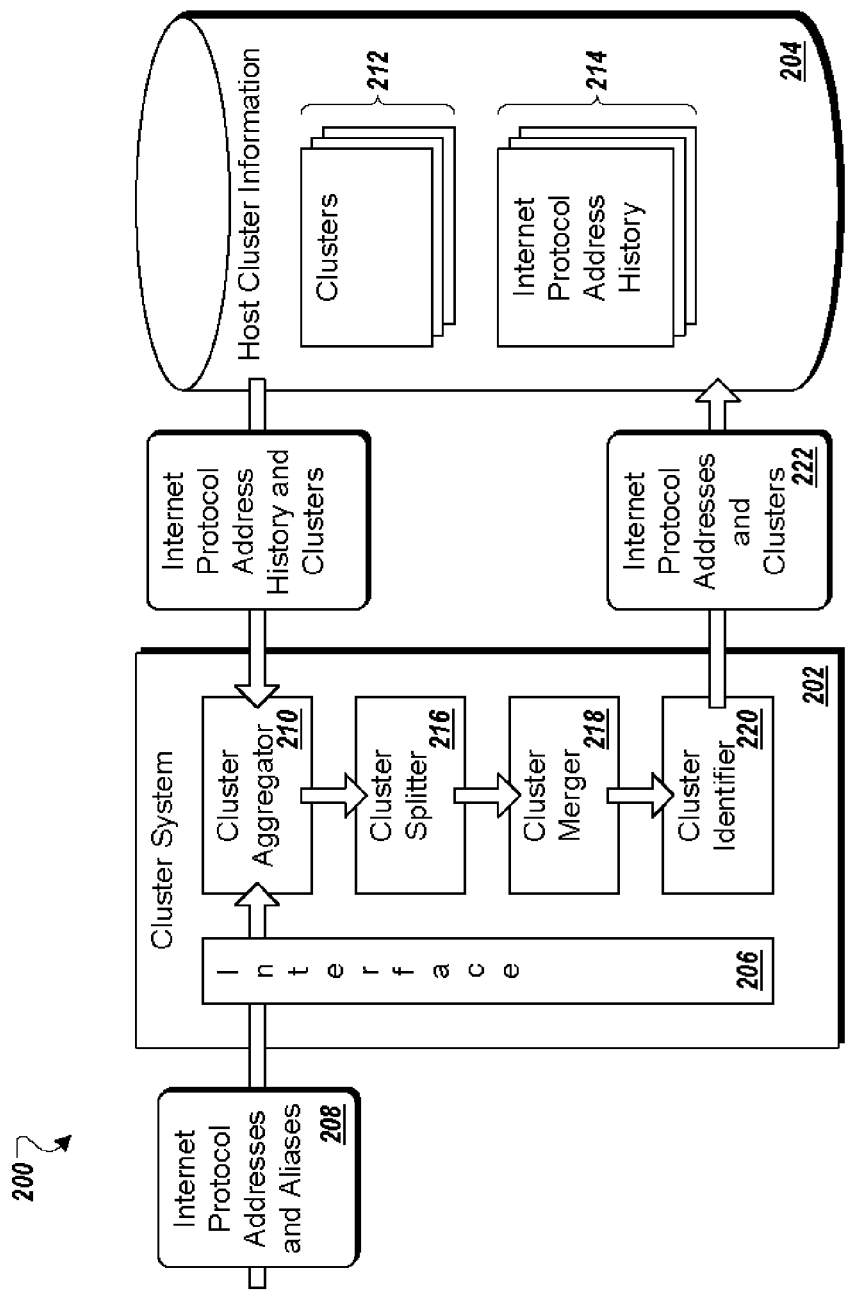
FIG. 2 is a block diagram showing an example system for identifying websites hosted by an Internet hosting entity.

FIG. 2 is a block diagram showing an example system 200 for identifying websites hosted by an Internet hosting entity. The system 200 includes a cluster system 202 and a host cluster information data store 204. The cluster system 202 includes an interface 206 for receiving one or more updates 208 to the IP addresses and canonical names of the websites. For example, the interface 206 may provide a connection to a domain name system for resolving hostnames into canonical names (CNAME) and IP addresses. In some implementations, the interface 206 includes a hardware interface to the network 106. In some implementations, the interface 206 performs operations for communicating with the domain name system 104 to retrieve canonical names and IP addresses for a particular hostname.

The cluster system 202 includes a cluster aggregator 210. The cluster aggregator 210 can combine information for one or more of the websites. For example, if the updates 208 indicate that a website has multiple IP addresses, then the cluster aggregator 210 can potentially identify the multiple IP addresses as being equivalent if many other updates also support this equivalency relationship. For example, the response from the domain name system in the updates 208 can include a list of multiple IP addresses for a particular hostname. In some implementations, the cluster aggregator 210 only identifies IP addresses as equivalent if the IP addresses are in the same network subnet. The use of these equivalent IP addresses will be described later with respect to merging groups of websites.

In another example, if two or more websites have the same CNAME, then the cluster aggregator 210 can combine the IP address information for the websites. In some implementations, a canonical name for a particular website's hostname can be determined by performing a DNS lookup of the hostname and identifying a CNAME in the results of the DNS lookup. Sometimes, the CNAME associated with a hostname can change back and forth frequently. A stable CNAME can be calculated by analyzing the history of CNAMEs associated with the hostname. For example, if a hostname repeatedly switches back and forth between a first CNAME and a second CNAME, and where a majority of time is spent with the first CNAME, then the first CNAME can be chosen as the CNAME for the hostname for use in comparing to other hostnames' CNAMEs. Over time, the CNAME may change again. The cluster aggregator 210 can perform a smoothing operation on these changes. This CNAME changes if a change to the CNAME, such as removing the CNAME or changing to another CNAME, does not exist for at least a threshold amount of time then the previous CNAME is reused. This can aid in identifying groups of websites where the IP address changes frequently, such as where load balancing DNS hosting is used.

In another example, a family of hosts in a domain (e.g., a domain with a wildcard DNS record) may be known to have the same IP address or family of IP addresses. In some implementations, the cluster aggregator 210 identifies a domain as being a wildcard domain by generating a dummy hostname probe. A dummy hostname probe is a hostname that is not expected to have an actual website within the suspected wildcard domain, but that has the same domain suffix. The cluster aggregator 210 performs a DNS lookup of the dummy hostname probe. If an IP address is returned, then a wildcard domain exists.

When the cluster aggregator 210 identifies a hostname that is a member of a wildcard domain, then the cluster aggregator 210 adds the hostname to the group of websites for that wildcard domain. For example, a domain such as "exampleblog.com" may be known to have member hostnames with the same IP address or the same family of IP addresses. Member hostnames in the "exampleblog.com" wildcard domain can include, for example, "baseball.exampleblog.com" and "birdwatching.exampleblog.com."

In some implementations, one or more hostnames within a wildcard domain are exceptions to the common IP address or family of IP addresses for the wildcard domain. For example, the cluster aggregator 210 can compare the IP address history of a sub-domain website to the IP address history of the domain; and if the histories are different, the cluster aggregator 210 identifies the sub-domain website as an exception. The cluster aggregator 210 can exclude these exception hostnames, on the basis of this wildcard domain criterion, from the group of websites for the wildcard domain. For example, the hostname "images.exampleblog.com" may be identified as an exception hostname if its IP address history is different than that of the wildcard domain "exampleblog.com." In this example, the "images.exampleblog.com" hostname may be hosted by an Internet hosting entity other than the Internet hosting entity that hosts the hostnames "baseball.exampleblog.com" and "birdwatching.exampleblog.com." Due to the "images.exampleblog.com" website being excluded from the group of websites for the "exampleblog.com" wildcard domain, the crawler is able to crawl the hosting entity of the "images.exampleblog.com" website independently of the websites in the wildcard domain hosted by another hosting entity.

In some implementations, the cluster aggregator 210 receives, from the host cluster information data store 204, data identifying one or more groups 212 that were previously identified by the cluster system 202. In some implementations, one or more websites have not previously been assigned to a group, such as when a website is first processed by the cluster aggregator 210. The cluster aggregator 210 receives one or more IP address histories 214 of the websites from the host cluster information data store 204. If one or more previously identified groups exist, then the cluster aggregator 210 uses the groups 212 that were previously identified as a starting point for identifying any changes to the groups based on the updates to the IP address histories. If one or more websites have not previously been assigned to a group, then the cluster aggregator 210 can group the websites based on their most frequently used IP address for static IP addresses or by multiple recently used IP addresses for dynamic IP addresses.

The IP address histories for the websites in a group are processed to select or compute a center of the IP addresses for multiple points in time during the histories of the websites. The center can be, for example, a mode (i.e., the IP address occurring most frequently for each point in time). The series of centers for a group of IP address histories will be referred to as a kernel of the group of IP address histories.

For example, three websites may have the following three IP address histories including (a, b, c) for a first hostname, (a, b, d) for a second hostname, and (a, e, d) for a third hostname. The (a, b, c) indicates, for example, that the first hostname had an IP address of "a" at a first point in time, an IP address of "b" at a second point in time, and an IP address of "c" at a third point in time. A point in time may represent a particular second, minute, hour, day, or a period or time at which the IP addresses are retrieved from the domain name system. If these three websites are in the same group, then the center of the IP address histories for the first point in time is "a" (all three hostnames were "a" at the first point in time), the center of the IP address histories for the second point in time is "b" ("b" is used twice and "e" is used once at the second point in time), and the center of the IP address histories for the third point in time is "d" ("c" occurs once and "d" occurs twice at the third point in time). The kernel of the three websites from the group in the example above is (a, b, d).

In another example of calculating the kernel of multiple IP address histories, after using the most-frequent-value method to calculate a preliminary kernel, the IP address history of the hostname in the group having the shortest distance from the preliminary kernel can be chosen as the final kernel. The distance can be measured by the number of points in time where the IP address history of a website does not match the preliminary kernel.

The cluster aggregator 210 provides the kernels of the groups 212 to a cluster splitter 216. The cluster splitter 216 compares the IP address history of each of the websites to the kernel of the corresponding group. If the distance between the IP address history of a website and the kernel of its group is greater than a threshold amount, then the cluster splitter 216 removes the website from the group. In some implementations, the measure of distance includes the amount of time during which the IP addresses do not match or the number of points in time at which the IP addresses do not match. For example, if the IP address history of the website does not match its kernel for more than one day, two days, three days, four days, or five days, then the cluster splitter 216 removes the website from the group.

In some implementations, the measure of distance includes the distance between the IP address values. For example, each IP address can be represented by an integer number with the most significant bit aligned with the highest network address number. The distance between two IP addresses represented as integers can be calculated by determining the difference between the two integers. In some implementations, the distance is an absolute value with no positive or negative sign. In some implementations, the contribution to the kernel of a group from the IP address history of a removed website is removed from the kernel before processing other members of the group.

The cluster splitter 216 provides the modified groups, from which one or more websites may have been removed, to a cluster merger 218. The cluster merger 218 compares the kernels of the groups to one another. If the distance between the kernels of a pair of groups is less than a threshold amount, then the cluster merger 218 identifies the pair of groups as a candidate for merging. The cluster merger 218 determines which group has the highest number of other groups that were identified as candidates for merging. The cluster merger 218 merges these groups into one group. The cluster merger 218 then determines which group has the next highest number of other candidate groups and merges those groups. In some implementations, the cluster merger 218 continues until all of the candidates have been merged. In some implementations, once a group of candidates has been merged, the cluster merger 218 removes the merged group from further consideration for merging based on the currently determined merge candidates.

In some implementations, the cluster splitter 216 and the cluster merger 218 take into account factors other than the distance between IP address histories when deciding whether to split a website from a group or to merge groups. For example, if the domain name system provided multiple IP addresses in a single lookup (e.g., an nslookup operation or a similar domain name system lookup operation) for a hostname of a website, then the cluster splitter 216 and/or the cluster merger 218 can treat the IP addresses as equivalent when determining the distance between the IP address histories. For example, if at a particular point in time a lookup of the hostname for a website returns three IP addresses, one of which matches the IP address from the corresponding point in time from the kernel for the group, then the cluster splitter 216 can calculate the contribution from that point in time to the distance between the IP address history of the website and the kernel as zero, regardless of whether the other two IP addresses match the kernel.

In some implementations, another factor affecting splitting and merging can include canonical names of the website hostnames. Two websites may have IP addresses that change frequently, but the websites may have the same CNAME. For example, a first hostname "example1.com" and a second hostname "example2.com" may both have the same CNAME "hostingcompanyexample.com." The CNAME information can be used in the determination of whether the first and second hostnames are candidates for splitting or merging. In some implementations, the time during which websites have the same CNAME can be treated as having equivalent IP addresses and processed accordingly by the cluster splitter 216 and the cluster merger 218. In some implementations, the cluster aggregator 210 can combine the IP address histories of websites having the same CNAME into a single IP address history prior to the splitting and merging process.

In some implementations, the cluster aggregator 210 maintains a history of CNAMEs for each of the hostnames. The cluster aggregator 210 uses the CNAME histories to smooth the detection of hostnames having the same canonical name. For example, a first hostname may repeatedly switch to having no canonical name for brief periods of time and spend most of its time with a particular canonical name. The smoothing process can omit the brief periods of no canonical name or brief periods of some other canonical name. The cluster aggregator 210 can then match the smoothed CNAME history to the CNAME history of a second hostname to determine that the two hostnames have the same canonical name for most of the history of the hostnames.

In some implementations, another factor affecting splitting and merging can include wildcard domains. Websites in a wildcard domain (e.g., "baseball.exampleblog.com" and "birdwatching.exampleblog.com" in "*.exampleblog.com") may have a family of IP addresses. The fact that hostnames are part of a wildcard domain can be used in the determination of whether the websites in the domain are candidates for splitting or merging. In some implementations, where the websites in the wildcard domain have a family of IP addresses (e.g., multiple addresses due to load balancing or multiple addresses returned in a single DNS lookup), then each website can be treated as having multiple equivalent IP addresses and processed accordingly by the cluster splitter 216 and the cluster merger 218. For example, the cluster splitter 216 can match any of the equivalent IP addresses for a website at a particular point in time with the center from the corresponding point in time of its kernel.

In some implementations, the cluster aggregator 210 combines the IP address histories of websites belonging to the same wildcard domain into a single IP address history prior to the splitting and merging process. For example, the cluster aggregator 210 can use the IP address history of a first website to fill in gaps in the IP address history of a second website where the websites belong to the same wildcard domain and the websites are not wildcard exceptions. In some implementations, a domain can include one or more exception hostnames that are not part of the wildcard domain and are not included in the combined IP address history or equivalent IP addresses.

The cluster merger 218 provides the modified groups to a cluster identifier 220. The cluster identifier 220 determines the identities of the modified groups. In particular, when a group is split or merged, the cluster identifier 220 determines which members of the groups will keep the original identity of their respective group and accordingly remain in the existing crawling queue for the group; and which members of the groups will be assigned to another group and accordingly be moved to the crawling queue for the other group. In some implementations, the cluster identifier 220 reassigns the group identities in order to minimize the number of URLs affected by any changes in identity. For example, when a splitting a website from a group where the website has six URLs and the remainder of the group includes a total of seven URLs, the cluster identifier 220 assigns the original identity to the remainder of the group (seven URLs) and assigns another group to the removed website (six URLs). The other group assigned to the removed website can be, for example, a new group or an existing group with which the removed website is a candidate for merging. The cluster identifier 220 sends an update 222 to the host cluster information data store 204. The update 222 includes updates to the groups 212 and the IP address histories 214 of the websites.

The steps of updating the DNS information of the websites, aggregating the IP address information, determining the kernels, splitting or merging groups, and providing the groups to a crawler can be repeated at regular or irregular intervals. Steps can be repeated in response to a detected condition, such as a change to an IP address of a hostname. Each cycle, the steps may be repeated for all of the websites or groups, or a portion of the websites or groups. Individual steps may be repeated as well. For example, the steps of determining the kernels and splitting or merging groups can be repeated, for example, until the groups converge to a steady state such as a static set of groups or a repetitive pattern of changes to the groups.

An IP address history of a website or a kernel of a group of websites can be represented graphically by a time series. The time series includes the changes in the IP address of the website or group over time. An individual IP address can be represented as a single number, such as a network byte order integer. For example, the IP address "209.131.36.158" ("D1.83.24.9E" in hexadecimal) can be represented as the network byte order integer "2653193169" ("9E2483D1" in hexadecimal). Alternatively, another byte order, number type, or format can be used to represent an IP address. The time series for the integer representations of the IP addresses for a website over time can be graphed to show various behaviors of the website as they relate to the Internet hosting entity of the website and crawling of the website.

Figure 3A:
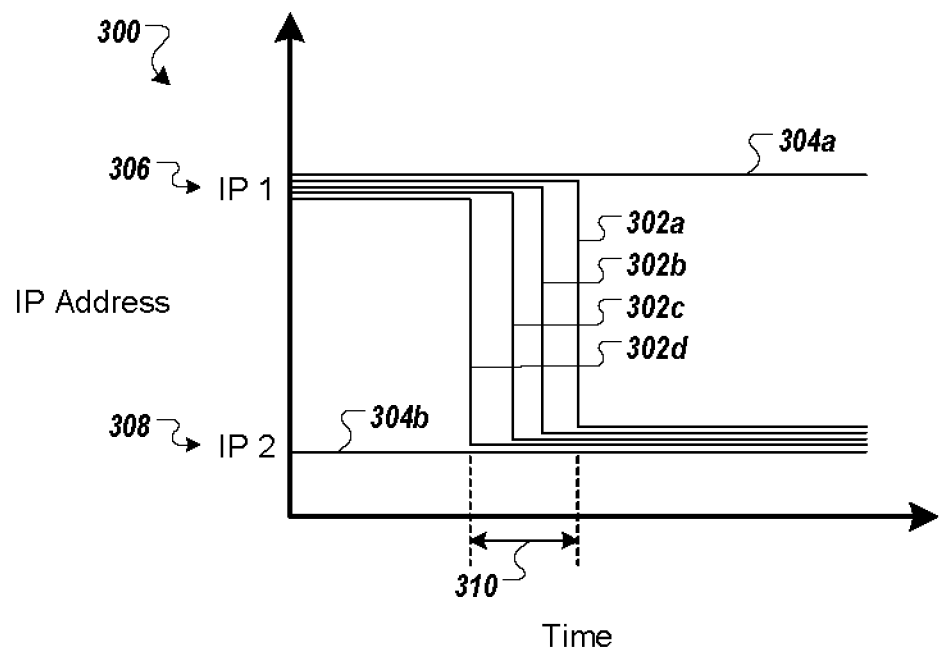
FIG. 3A is a graph of multiple IP address histories for individual websites and multiple kernels for groups of websites.

FIG. 3A is a graph 300 of multiple IP address histories 302a-d for individual websites and multiple kernels 304a-b for groups of websites. The graph 300 shows an example of multiple websites splitting from a first Internet hosting entity having a first static IP address 306 and merging with a second Internet hosting entity having a second static IP address 308. The graph 300 includes a y-axis representing the IP address of the websites and an x-axis representing time. In this example, the cluster splitter 216 identifies the IP address histories 302a-d as having a distance from the kernel 304a for the corresponding group that is greater than a threshold distance. Accordingly, the cluster splitter 216 removes the websites for the IP address histories 302a-d from the group. The cluster merger 218 determines that the IP address histories 302a-d are within a threshold distance from the kernel 304b of another group. The cluster merger 218 then combines the websites for the IP address histories 302a-d with the group represented by the kernel 304b.

In some implementations, the cluster aggregator 210 determines a type of the IP address history for a website. For example, the IP address histories 302a-d do not frequently change, accordingly the cluster aggregator 210 determines that the IP address histories 302a-d and the kernel 304a are of a static type. Different types of IP address histories may be handled in different ways by the cluster splitter 216 and the cluster merger 218. For example, in the case of a static IP address, the cluster splitter 216 may wait a predetermined amount of time 310 before removing a website from a group.

This allows delays in the domain name system to be propagated to the hostnames of the other websites that may also be transitioning to a new Internet hosting entity. In some implementations, this also allows a website to briefly transition to a transient or temporary IP address and then transition back to the IP address of the group before the cluster splitter 216 removes the website from the group.

Figure 3B:
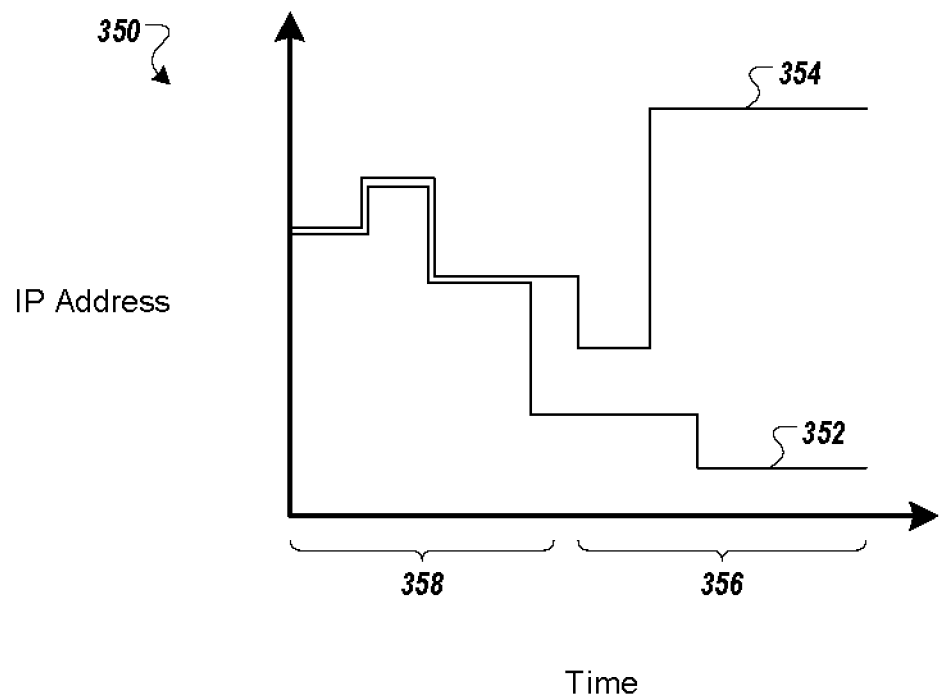
FIG. 3B is a graph of an IP address history for an individual website and a kernel for a group that includes the website.

FIG. 3B is a graph 350 of an IP address history 352 for an individual website and a kernel 354 for a group that includes the website. The graph 350 shows an example of a website splitting from an Internet hosting entity having a dynamic IP address. The cluster aggregator 210, for example, may identify the IP address history 352 and the kernel 354 as dynamic based on the number of IP address changes in a particular amount of time and the number of sitenames on these IP addresses. The concept of a sitename is described below in connection with a description of virtual hosting entities. In some implementations, when an IP address history is identified as dynamic, then the cluster splitter 216 and the cluster merger 218 compare larger amounts of the IP address history than are compared for static IP address histories. In some implementations, the cluster splitter 216 and the cluster merger 218 place a higher weight on a portion of the IP address history that is more recent than an older portion. For example, the cluster splitter 216 can place a higher weight on a most recent portion 356 of the IP address history 352 rather than an older portion 358 of the IP address history 352. The length of the weighted portions can be, for example, a fixed amount of time, a percentage of time of the length of the IP address history, or a fixed number of IP address samples. If the weighted distance is greater than the threshold for splitting, then the cluster splitter 216 removes the website for the IP address history 352 from the group represented by the kernel 354.

Sometimes, IP address histories include a type representing websites hosted by a virtual hosting entity. A virtual hosting entity is an Internet hosting entity that hosts many hostnames. The cluster aggregator 210, for example, can identify virtual hosting entities by determining the number of unique sitenames in a group of hostnames associated with a particular hosting entity. A sitename is the first portion of a hostname past any top level domains (TLDs) and not including any further sub-domains. For example, a group of hostnames identified as having the same IP address histories includes the following four hostnames, "cs.example1.com," www.example1.edu, www.example2.com.cn," and "www.example2.com." The corresponding sitenames are "example1," "example1," "example2," and "example2," respectively. In this example, the total number of unique sitenames is two, "example1" and "example2."

The cluster aggregator 210 compares the number of unique sitenames to a threshold number of unique sitenames for virtual hosting entities, such as ten or more, twenty or more, forty or more, eighty or more, or one hundred or more to identify the group as belonging to a virtual hosting entity. If a website is identified as belonging to a virtual hosting entity, then the cluster splitter 216 and the cluster merger 218 can immediately move the website to or from the group associated with the virtual hosting entity rather than waiting for the delay period applied to static IP addresses.

FIG. 4A is a graph 400 of a kernel 402 for a first group and a kernel 404 for a second group. The graph 400 shows an example of a pair of groups merging due to having a same single-value IP address. The cluster merger 218 determines that the first and second groups have the same IP address and identifies the first and second groups as candidates for merging.

FIG. 4B is a graph 420 of a kernel 422 for a first group and a kernel 424 for a second group. The graph 420 shows an example of a pair of groups merging due to having similar IP address histories. If only minor differences exist between the kernel 422 and the kernel 424 (e.g., the distance between the two is small), then the cluster merger 218 identifies the first and second groups as candidates for merging.

FIG. 4C is a graph 440 of a kernel 442 for a first group and a kernel 444 for a second group. The graph 440 shows an example of a pair of groups merging due to the kernel 442 of the first group converging to the kernel 444 of the second group. The cluster merger 218 can place a greater weight on a more recent portion of the kernel 442 where the kernel 442 has converged to the same value of the kernel 444. As a result, the cluster merger 218 identifies the first and second groups as candidates for merging.

FIG. 4D is a graph 460 of a first kernel 462 for a first group and a second kernel 464 for a second group. The graph 460 shows an example of a pair of groups merging due to the first kernel 462 of the first group being contained within the second kernel 464 of the second group. In this example, the first kernel 462 is missing some data but the IP address information that exists is the same as the corresponding IP address information for the second kernel 464. Therefore, even though some data is missing, the cluster merger 218 can identify the first and second groups as candidates for merging if, for example, the kernel with some missing data is contained completely within another kernel. In some implementations, the cluster merger 218 and the cluster splitter 216 require a threshold amount of IP address data for each group or website in order to perform a split or merge operation, such as one day or more, two days or more, five days or more, or one week or more.

Figure 5:
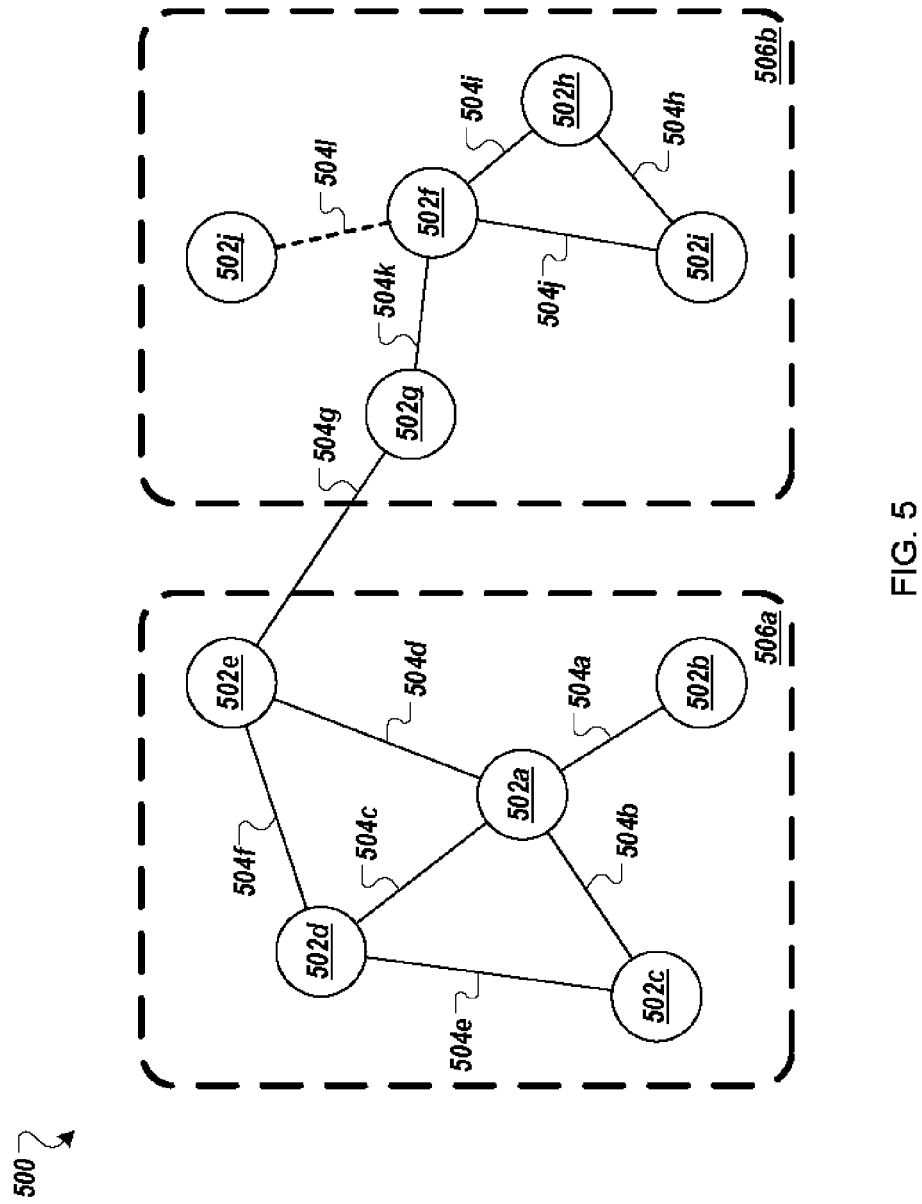
FIG. 5 is a star topology graph showing an example of merging Internet hosting entities.

FIG. 5 is a star topology graph 500 showing an example of merging Internet hosting entities. The star topology graph 500 shows an example of merging groups that have been identified as candidates for merging. The graph 500 includes multiple groups 502a-j that have been identified by the cluster merger 218 as candidates for merging. The graph 500 also includes multiple edges 504a-1. The edges 504a-l join pairs of candidate groups that are identified as candidates for merging. The cluster merger 218 determines which of the groups 502a-j has the highest number of edges joining the group to candidate pairs. In this example, the group 502a has the highest number of four edges. These include the edges 504a-d. The cluster merger 218 combines the group 502a with the groups 502b-e into a group 506a.

Sometimes, a group does not include enough IP address data to be included in the merging decision. For example, the group 502j does not have the minimum amount of IP address data. The group 502j was identified as a candidate for merging with the group 502f, as shown by the edge 504l. When determining the highest number of edges, the cluster merger 218 ignores edges to groups that do not have the threshold amount of IP address data. After the group 506a is created by merging the groups 502a-e, the cluster merger 218 continues the process by identifying the next group with the highest number of edges that has not already been merged with another group. The cluster merger 218 identifies the group 502f as having the next highest number of edges. These include the edges 504i-k. This number of edges does not include the edge 504l, as the group 502j does not have the threshold amount of IP address data. The cluster merger 218 combines the group 502f with the groups 502g-j into a group 506b.

Sometimes, the cluster aggregator 210 can interpolate IP address data for a website and, correspondingly, for the kernel based on the IP address data of the website. For example, if the IP address history for a hostname includes a constant IP address and several missing IP address samples, then the cluster aggregator 210 interpolates the missing IP address samples as being the same as the constant IP address. In another example, if the IP address histories of a hostname or group of hostnames have predictable pattern of IP address changes (e.g., a load balancing pattern that repeats a series of three IP addresses) and several IP address samples are missing from the histories, then the cluster aggregator 210 interpolates the missing sample as including the corresponding IP addresses from the pattern.

In another example, the IP address histories of a hostname or group of hostnames may have a random pattern of IP address changes. However, the random pattern may use a fixed set of IP addresses (e.g., a random load balancing pattern). If IP address samples are missing from the histories, then the cluster aggregator 210 identifies the fixed set of IP addresses as equivalent IP addresses for the website or group. Accordingly, any of the fixed set of IP addresses can be used in place of the missing samples, for example, in a comparison between a website and a kernel or between two kernels.

Figure 6:
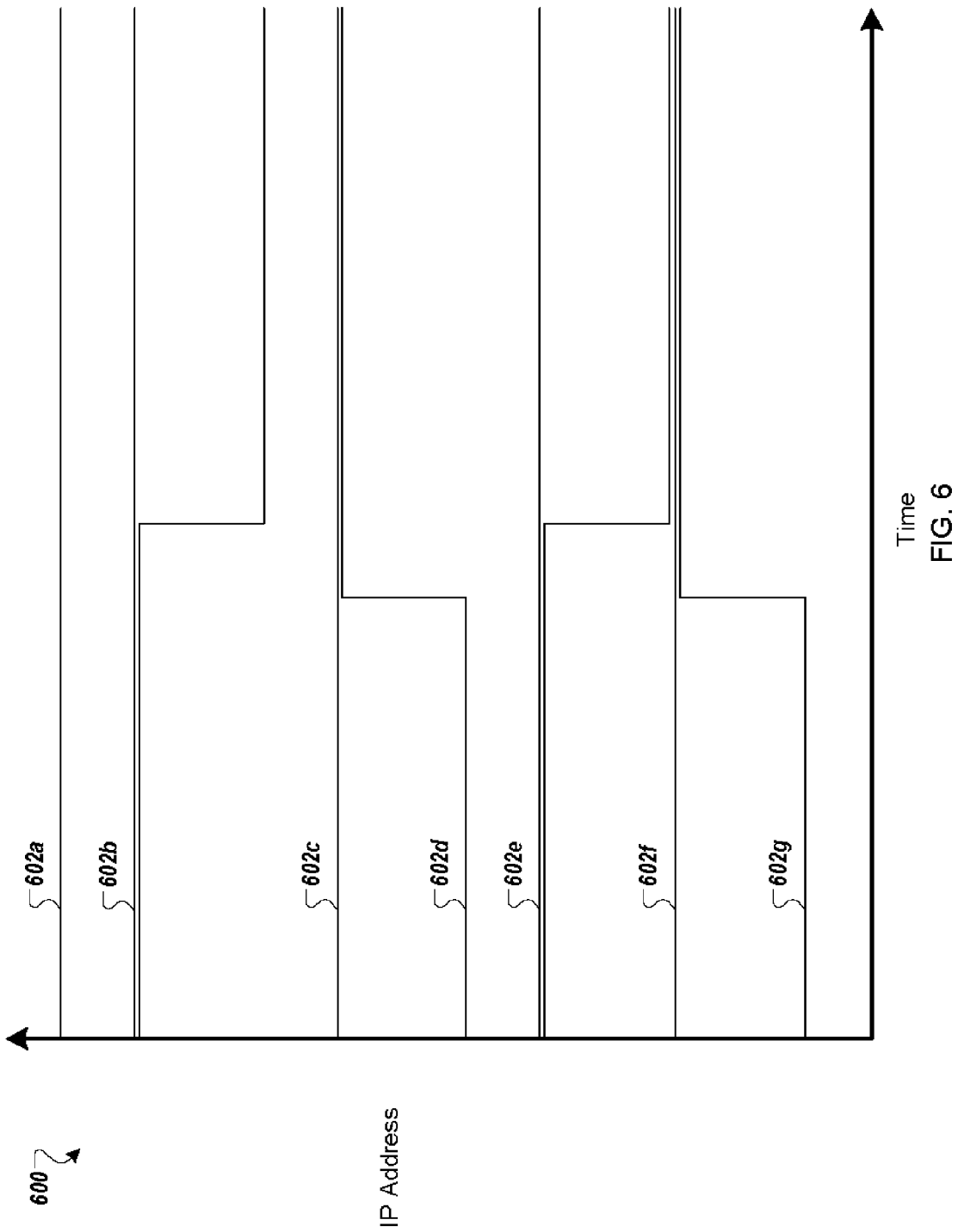
FIG. 6 is a graph of Internet Protocol address histories showing examples of websites splitting from and merging with Internet hosting entities.

FIG. 6 is a graph 600 of Internet Protocol address histories showing examples of websites splitting from and merging with Internet hosting entities. The graph 600 shows multiple kernels 602a-g. The kernels 602a-g correspond to groups of websites hosted by Internet hosting entities, such as the Internet hosting entities 110a-g. The kernel 602a remains constant over the time interval and does not undergo any IP address changes. The cluster splitter 216 determines that the kernel 602b splits into two groups. The cluster merger 218 determines that the kernels 602c-d merge into one group. The cluster splitter 216 determines that the kernel 602e splits into two groups. The cluster merger 218 determines that the kernels 602f-g and one of the groups that split from the kernel 602e merge into to one group.

Figure 7:
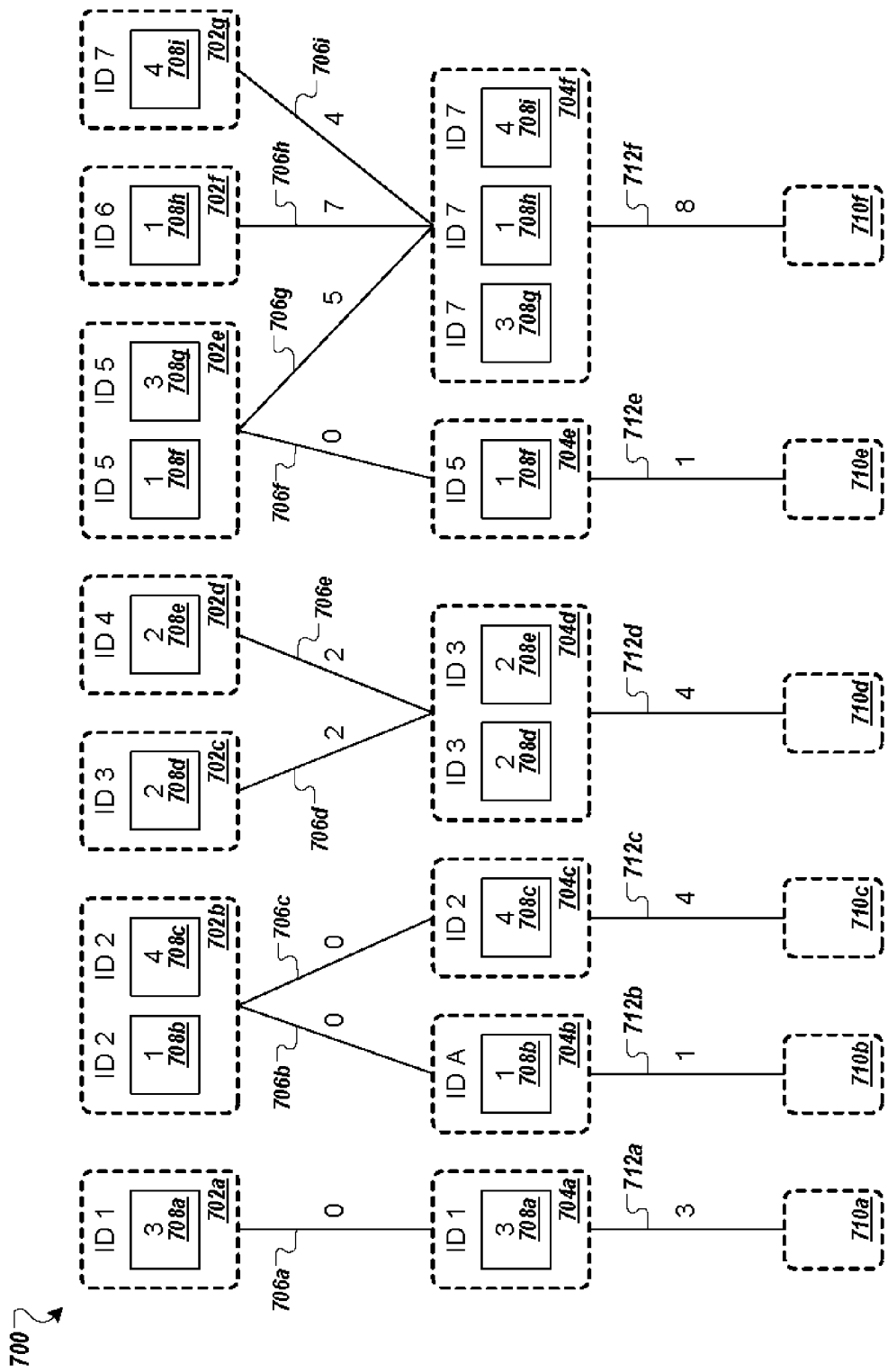
FIG. 7 is graph showing an example of choosing identities for split or merged groups of websites.

FIG. 7 is a graph 700 showing an example of choosing identities for split or merged groups of websites. The cluster identifier 220 uses the graph 700 to minimize the number of URLs affected when choosing how to reuse the existing identities of the groups of websites. The graph 700 includes multiple nodes 702a-g that represent the original groups prior to splitting and merging. The graph 700 includes multiple nodes 704a-f that represent the new groups after splitting or merging. The graph 700 includes multiple edges 706a-i that indicate a splitting of a website from a group or a merging of groups. Each of the nodes 702a-g and 704a-f include an indication of one or more websites 708a-i included in the node and the number of URLs in the website. The graph 700 also includes multiple virtual nodes 710a-f and corresponding multiple virtual edges 712a-f.

For merge operations, the cluster identifier assigns a value to the edges 706a-i that represents the number of URLs that would be affected if the identity of that original group were reused for the corresponding new merged group. For example, the edges 706d-e both result in two URLs being affected. The cluster identifier 220 can choose the identity of either of the nodes 702d-e. In some implementations, when a tie occurs between the number of URLs affected, the group including the highest number of websites can be chosen as a tie breaker. In this example, the tie remains as the nodes 702d-e each include one website, the websites 708d-e, respectively.

In the merger resulting in the node 704f, the edge 706i indicates that the four URLs from the websites 708g-h would be affected by choosing the identity of the node 702g for the node 704f. The edge 706h indicates that the seven URLs from the websites 708g and 708i would be affected by choosing the identity of the node 702f for the node 704f. The edge 706g indicates that the five URLs from the websites 708h-i would be affected by choosing the identity of the node 702e. The cluster identifier 220 chooses the identity of the node 702g as it results in the smallest number of other URLs being affected.

For split operations, the cluster identifier 220 assigns a value to the virtual edges 712a-f that represents the number of URLs that would be affected if the identity of the corresponding original node is not reused. For example, the virtual edge 712b indicates that one URL will be affected if the identity of the node 702b is not chosen. The virtual edge 712c indicates that four URLs will be effected if the identity of the node 702b is not chosen. Therefore, the cluster identifier 220 chooses to assign the identity of the node 702b to the node 704c as it results in effecting fewer URLs. The cluster identifier 220 generates a new identity for the node 704b.

In the split resulting in the nodes 704e-f, the cluster identifier 220 has already chosen the identity of the node 702g for the node 704f. Therefore, the cluster identifier 220 can choose the identity of the node 702e for the node 704e. If the edge 706g had previously been identified as having the least effect on URLs in the merger forming the node 704f, then the cluster identifier 220 could compare the virtual edge 712e (the number of URLs effected if the identity of the node 702e is not used for the node 704e) to the number of URLs effected if the identity of the node 702e is not used for the node 704f. For example, if the identity of the node 702e is used for the node 704f, then the one URL split from the node 702e is effected as well as the one URL from the node 702f and the four URLs from the node 702g. This results in a total of six effected URLs. Therefore, using the identity of the node 702e for the node 704e results in the least effect on rescheduling crawls of URLs. This minimization process is modeled using the minimum weighted maximum matching problem in the bipartite graph shown in FIG. 7.

Figure 8:
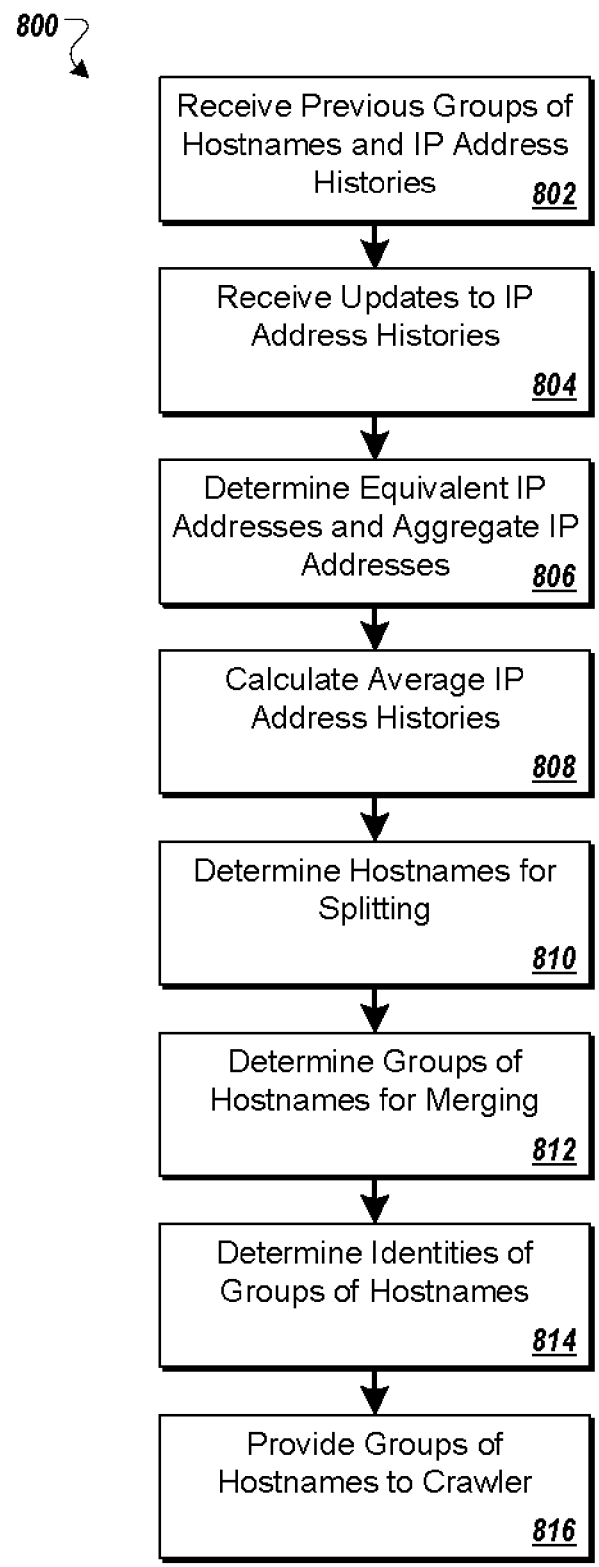
FIG. 8 is a flow chart showing an example of a process for identifying websites hosted by an Internet hosting entity.

FIG. 8 is a flow chart showing an example of a process 800 for identifying websites hosted by an Internet hosting entity. If previously determined groups of websites exist, then the process 800 receives (802) the previously determined groups. For example, the cluster aggregator 210 retrieves data indentifying the previously determined groups 212 from the host cluster information data store 204. If previously determined groups do not exist or if one or more websites do not have previously determined groups, then the process 800 calculates an initial set of groups for the websites that do not already have groups. The process 800 also receives an IP address history for each of the websites. For example, the cluster aggregator 210 retrieves the IP address histories 214 from the host cluster information data store 204.

The process 800 receives (804) updates to the IP address histories. For example, the cluster system 102 sends requests for information to the domain name system 104 regarding the hostnames of the websites. The domain name system 104 informs the cluster system 102 of the current IP address or addresses of each hostname and any canonical name for each hostname.

The process 800 determines (806) that one or more of the hostnames have equivalent IP addresses. For example, the cluster aggregator 210 can determine that one or more hostnames repeatedly cycle through a fixed set of IP addresses over time. The cluster aggregator 210 identifies the fixed set of IP addresses as equivalent for those hostnames. The process 800 aggregates the IP address histories for hostnames having the same canonical name and for hostnames belonging to the same wildcard domain.

For each group of websites, the process 800 calculates (808) a kernel of the IP address histories for the group. For example, the cluster aggregator 210 calculates the kernel as the most frequently occurring IP address at each point in time.

The process 800 compares (810) the individual IP address histories of the hostnames to their corresponding kernels to determine one or more hostnames to be split from their groups. The process 800 compares (812) the kernels of the groups to determine one or more groups to be merged together. For example, the cluster merger 218 identifies all of the kernels that meet a threshold level of similarity. The similarities are represented as a star topology and the cluster merger 218 merges the group having the greatest number of edges to similar groups. The merged group is removed from further consideration and the cluster merger 218 identifies and merges the group with the next highest number of edges.

The process 800 analyzes (814) the changes in the groups to determine identities for the groups that minimize the affect on the crawling queues for the groups. For example, the cluster identifier 220 uses the bipartite graph 700 to analyze the number of URLs affected by reusing or reassigning identities of groups.

The process 800 provides the data identifying the groups of websites to a crawler for use in scheduling crawls of the websites. In some implementations, one or more steps of the process 800 may be repeated. For example, the steps of updating (804) the IP address histories, determining (806) that hostnames have equivalent IP addresses and aggregating IP address information, calculating (808) kernels, splitting (810), merging (812), identifying (814), and providing (816) to a crawler may be repeated. Some steps may be performed in a different order. For example, merging may occur before splitting.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be, or be included in, a computer-readable storage device, a computer-readable storage substrate, a random or serial access memory array or device, or a combination of one or more of them.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or combinations of them. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, e.g., a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, the cluster splitter 216 can compare the IP address history of a website to each IP address history in the group rather than the kernel of the group. Similarly, the cluster merger 218 can compare the IP address histories of each website between two groups rather than the kernels of the groups.

What is claimed is:

1. A system comprising one or more computers programmed to perform operations comprising:
    maintaining an Internet Protocol (IP) address history for each hostname in a plurality of hostnames, where each IP address history is a time series of IP addresses;
    organizing the hostnames into a collection of groups so that each hostname of the plurality of hostnames is a member of exactly one group in the collection of groups, where each group has a kernel calculated from the IP address histories of the members of the group, and where the IP address history of each member of the group is within a threshold distance of the kernel of the group;
    providing to a crawler, for use in scheduling a crawl of the plurality of hostnames, data describing the collection of groups;
    receiving an update to an IP address history for a first hostname of the plurality of hostnames, the first hostname being a member of a first group of the collection of groups, and recalculating a first kernel of the first group using the updated IP address history of the first hostname;
    receiving an update to an IP address history for a second hostname, the second hostname being a member of a second group of the collection of groups, and recalculating a second kernel of the second group using the updated IP address history of the second hostname; and
    determining that the first kernel is within the threshold distance of the second kernel and, as a result, merging the first group and the second group into a single group in the collection of groups.

2. The system of claim 1, wherein the operations further comprise:
    selecting a crawling schedule of the first group or the second group for use with the merged single group, where hostnames of the first and second groups are associated with respective numbers of Uniform Resource Locators (URLs) and the selected crawling schedule is chosen to minimize a total number of URLs that are changed to a new crawling schedule as a result of the selection.

3. The system of claim 1, wherein the operations further comprise selecting the first group and the second group for merging based on the first group having a highest number of edges in a star topology, the edges connecting the first group to one or more candidate groups that are candidates for merging with the first group, the candidate groups including the second group.

4. The system of claim 3, wherein the candidate groups include a candidate group that does not have a threshold amount of data within the IP address histories, and, as a result, the candidate group does not contribute to the number of edges for the first group.

5. The system of claim 1, wherein the operations further comprise determining from the IP address histories that the first group and the second group include dynamic IP addresses, and wherein determining that the first kernel is within the threshold distance of the second kernel comprises comparing a longer portion of the first kernel and the second kernel than is compared for groups having static IP addresses.

6. The system of claim 1, wherein the operations further comprise determining from the IP address histories that the first group includes static IP addresses and, as a result, the merging is performed after a predetermined delay.

7. The system of claim 1, wherein the operations further comprise determining that the first group includes more than a predetermined number of sitenames and, as a result, the combining is performed without delay.

8. The system of claim 1, wherein the operations further comprise performing the step of receiving the updates to the IP address histories for the first and second hostnames at a first network location and at a second network location.

9. A computer-implemented method comprising:
maintaining an Internet Protocol (IP) address history for each hostname in a plurality of hostnames, where each IP address history is a time series of IP addresses;
organizing the hostnames into a collection of groups so that each hostname of the plurality of hostnames is a member of exactly one group in the collection of groups, where each group has a kernel calculated from the IP address histories of the members of the group, and where the IP address history of each member of the group is within a threshold distance of the kernel of the group;
providing to a crawler, for use in scheduling a crawl of the plurality of hostnames, data describing the collection of groups;
receiving an update to an IP address history for a first hostname of the plurality of hostnames, the first hostname being a member of a first group of the collection of groups, and recalculating a first kernel of the first group using the updated IP address history of the first hostname;
receiving an update to an IP address history for a second hostname, the second hostname being a member of a second group of the collection of groups, and recalculating a second kernel of the second group using the updated IP address history of the second hostname; and
determining that the first kernel is within the threshold distance of the second kernel and, as a result, merging the first group and the second group into a single group in the collection of groups.

10. The method of claim 9, wherein the operations further comprise:
selecting a crawling schedule of the first group or the second group for use with the merged single group, where hostnames of the first and second groups are associated with respective numbers of Uniform Resource Locators (URLs) and the selected crawling schedule is chosen to minimize a total number of URLs that are changed to a new crawling schedule as a result of the selection.

11. The method of claim 9, wherein the operations further comprise selecting the first group and the second group for merging based on the first group having a highest number of edges in a star topology, the edges connecting the first group to one or more candidate groups that are candidates for merging with the first group, the candidate groups including the second group.

12. The method of claim 11, wherein the candidate groups include a candidate group that does not have a threshold amount of data within the IP address histories, and, as a result, the candidate group does not contribute to the number of edges for the first group.

13. The method of claim 9, wherein the operations further comprise determining from the IP address histories that the first group and the second group include dynamic IP addresses, and wherein determining that the first kernel is within the threshold distance of the second kernel comprises comparing a longer portion of the first kernel and the second kernel than is compared for groups having static IP addresses.

14. The method of claim 9, wherein the operations further comprise determining from the IP address histories that the first group includes static IP addresses and, as a result, the merging is performed after a predetermined delay.

15. A non-transitory computer storage medium having instructions stored thereon that, when executed by data processing apparatus, cause the data processing apparatus to perform operations comprising:
maintaining an Internet Protocol (IP) address history for each hostname in a plurality of hostnames, where each IP address history is a time series of IP addresses;
organizing the hostnames into a collection of groups so that each hostname of the plurality of hostnames is a member of exactly one group in the collection of groups, where each group has a kernel calculated from the IP address histories of the members of the group, and where the IP address history of each member of the group is within a threshold distance of the kernel of the group;
providing to a crawler, for use in scheduling a crawl of the plurality of hostnames, data describing the collection of groups;
receiving an update to an IP address history for a first hostname of the plurality of hostnames, the first hostname being a member of a first group of the collection of groups, and recalculating a first kernel of the first group using the updated IP address history of the first hostname;
receiving an update to an IP address history for a second hostname, the second hostname being a member of a second group of the collection of groups, and recalculating a second kernel of the second group using the updated IP address history of the second hostname; and
determining that the first kernel is within the threshold distance of the second kernel and, as a result, merging the first group and the second group into a single group in the collection of groups.

16. The non-transitory computer storage medium of claim 15, wherein the operations further comprise: selecting a crawling schedule of the first group or the second group for use with the merged single group, where hostnames of the first and second groups are associated with respective numbers of Uniform Resource Locators (URLs) and the selected crawling schedule is chosen to minimize a total number of URLs that are changed to a new crawling schedule as a result of the selection.

17. The non-transitory computer storage medium of claim 15, wherein the operations further comprise selecting the first group and the second group for merging based on the first group having a highest number of edges in a star topology, the edges connecting the first group to one or more candidate groups that are candidates for merging with the first group, the candidate groups including the second group.

18. The non-transitory computer storage medium of claim 17, wherein the candidate groups include a candidate group that does not have a threshold amount of data within the IP address histories, and, as a result, the candidate group does not contribute to the number of edges for the first group.

19. The non-transitory computer storage medium of claim 15, wherein the operations further comprise determining from the IP address histories that the first group and the second group include dynamic IP addresses, and wherein determining that the first kernel is within the threshold distance of the second kernel comprises comparing a longer portion of the first kernel and the second kernel than is compared for groups having static IP addresses.

20. The non-transitory computer storage medium of claim 15, wherein the operations further comprise determining from the IP address histories that the first group includes static IP addresses and, as a result, the merging is performed after a predetermined delay.

21. The non-transitory computer storage medium of claim 15, wherein the operations further comprise determining that the first group includes more than a predetermined number of sitenames and, as a result, the combining is performed without delay.

22. The non-transitory computer storage medium of claim 15, wherein the operations further comprise performing the step of receiving the updates to the IP address histories for the first and second hostnames at a first network location and at a second network location.

\* \* \* \* \*